(12) United States Patent
Park et al.

(10) Patent No.: US 11,815,258 B2
(45) Date of Patent: Nov. 14, 2023

(54) LIGHT EMITTING MODULE AND LENS

(71) Applicant: Seoul Semiconductor Co., Ltd., Ansan-si (KR)

(72) Inventors: Jae Eun Park, Ansan-si (KR); Eun Ju Kim, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 17/531,795

(22) Filed: Nov. 21, 2021

(65) Prior Publication Data

US 2022/0154913 A1    May 19, 2022

Related U.S. Application Data

(63) Continuation of application No. 17/335,005, filed on May 31, 2021, which is a continuation of application (Continued)

(30) Foreign Application Priority Data

Mar. 15, 2018   (KR) .................. 10-2018-0030411
Dec. 3, 2018    (KR) .................. 10-2018-0153573

(51) Int. Cl.
  *F21V 5/04*   (2006.01)
  *F21V 5/00*   (2018.01)
  (Continued)

(52) U.S. Cl.
  CPC .............. *F21V 5/045* (2013.01); *F21V 5/007* (2013.01); *F21V 5/04* (2013.01); *F21V 7/05* (2013.01); *F21Y 2115/10* (2016.08)

(58) Field of Classification Search
  CPC . F21V 5/045; F21V 5/007; F21V 5/04; F21V 5/048; F21Y 2115/10
  (Continued)

(56) References Cited

U.S. PATENT DOCUMENTS 8,251,548 B2   8/2012 Zhang et al.
8,651,707 B1   2/2014 Tang et al.
(Continued)

FOREIGN PATENT DOCUMENTS

CN    105546475    5/2016
CN    105627250    6/2016
(Continued)

OTHER PUBLICATIONS

International Search Report issued for PCT/KR2019/002705 dated Jun. 24, 2019.

(Continued)

*Primary Examiner* — Laura K Tso
(74) *Attorney, Agent, or Firm* — H.C. Park & Associates, PLC

(57) ABSTRACT

A lens for dispersing light emitted from a light emitting device, the lens including a lower surface, a light incident portion having a concave shape from the lower surface, the light incident portion having a light incident surface, and a light exit portion through which light having entered the lens through the light incident portion exits the lens to an outside of the lens, in which the light incident surface includes at least one protruding light incident facet.

19 Claims, 17 Drawing Sheets

Related U.S. Application Data

No. 16/981,256, filed as application No. PCT/KR2019/002705 on Mar. 8, 2019, now Pat. No. 11,022,274.

(51) Int. Cl.
  *F21V 7/05* (2006.01)
  *F21Y 115/10* (2016.01)

(58) Field of Classification Search
  USPC ..................................... 362/311.02, 311.06
  See application file for complete search history.

(56) References Cited

U.S. PATENT DOCUMENTS

| | | | |
|---|---|---|---|
| 8,714,783 | B2 | 5/2014 | Lee et al. |
| 8,833,979 | B2 | 9/2014 | Wang et al. |
| 8,956,010 | B2 | 2/2015 | Huang |
| 9,568,768 | B2 | 2/2017 | Tran et al. |
| 10,060,579 | B2 | 8/2018 | Kim et al. |
| 10,203,086 | B2 | 2/2019 | Kang |
| 10,209,532 | B2 | 2/2019 | Parker |
| 10,408,417 | B2 | 9/2019 | Fukuda et al. |
| 10,704,744 | B2 | 7/2020 | Oh |
| 11,022,274 | B2 | 6/2021 | Park |
| 11,499,696 | B2 * | 11/2022 | Park ................. F21V 5/045 |
| 2008/0100773 | A1 | 5/2008 | Hwang et al. |
| 2011/0075428 | A1 | 3/2011 | Chen et al. |
| 2012/0057354 | A1 | 3/2012 | Lee et al. |
| 2013/0114022 | A1 | 5/2013 | Iiyama et al. |
| 2013/0320843 | A1 * | 12/2013 | Lee ................... F21V 5/045 |
| | | | 362/326 |
| 2014/0003059 | A1 | 1/2014 | Wang et al. |
| 2014/0104853 | A1 | 4/2014 | Lin et al. |
| 2014/0362589 | A1 * | 12/2014 | Chen ................. G02B 19/0023 |
| | | | 362/335 |
| 2015/0029728 | A1 | 1/2015 | Hu et al. |
| 2015/0103534 | A1 | 4/2015 | Hu et al. |
| 2015/0138759 | A1 | 5/2015 | Nameda et al. |
| 2015/0219286 | A1 | 8/2015 | Yoon et al. |
| 2015/0378214 | A1 | 12/2015 | Tran et al. |
| 2016/0201875 | A1 | 7/2016 | Kang et al. |
| 2016/0356451 | A1 | 12/2016 | Lin et al. |
| 2017/0059121 | A1 * | 3/2017 | Chiu ................. F21V 5/045 |
| 2017/0212386 | A1 | 7/2017 | Fujii |
| 2017/0234507 | A1 | 8/2017 | Kang |
| 2017/0328537 | A1 | 11/2017 | Fukuda et al. |
| 2017/0356628 | A1 | 12/2017 | Lee |
| 2018/0051863 | A1 | 2/2018 | Lee et al. |

FOREIGN PATENT DOCUMENTS

| | | |
|---|---|---|
| CN | 107002976 | 8/2017 |
| CN | 107085252 | 8/2017 |
| CN | 206610827 | 11/2017 |
| EP | 2963474 | 1/2016 |
| JP | 2010-129202 | 6/2010 |
| KR | 10-2013-0081866 | 7/2013 |
| KR | 2013-0081866 | 7/2013 |
| KR | 10-2014-0060625 | 5/2014 |
| KR | 10-2015-0094550 | 8/2015 |
| KR | 10-2017-0096370 | 8/2017 |
| KR | 10-2018-0020460 | 2/2018 |
| KR | 10-2018-0034929 | 4/2018 |
| WO | 2013088556 | 6/2013 |
| WO | 2013124315 | 8/2013 |
| WO | 2017135801 | 8/2017 |

OTHER PUBLICATIONS

Notice of Allowance dated Feb. 4, 2021, issued to U.S. Appl. No. 16/981,256.
Non-Final Office Action dated Oct. 14, 2021, in U.S. Appl. No. 17/335,005.
Extended European Search Report dated Dec. 7, 2021, issued in European Patent Application No. 19767790.9 (with English Translation).
Final Office Action dated Jan. 24, 2022, in U.S. Appl. No. 17/335,005.
Extended European Search Report dated Aug. 12, 2022 in European Patent Application No. 21215767.1.
Office Action dated Nov. 21, 2022 from the Chinese Patent Office for Chinese Patent Application No. 201980000919.1. (with English Concise Explanation).
Office Action dated Jun. 17, 2023 for Chinese Patent Application No. 201980000919.1(with English Concise Explanation).

* cited by examiner (a)

(b)

LIGHT EMITTING MODULE AND LENS

CROSS REFERENCE TO RELATED APPLICATIONS

This application is a Continuation of U.S. patent application Ser. No. 17/335,005, filed on May 31, 2021, which is a Continuation of U.S. patent application Ser. No. 16/981,256, filed on Sep. 15, 2020, now issued as U.S. Pat. No. 11,022,274, which is a National Stage Entry of International Application No. PCT/KR2019/002705, filed on Mar. 8, 2019, which claims priority from and the benefit of Korean Patent Application No. 10-2018-0030411, filed on Mar. 15, 2018, and Korean Patent Application No. 10-2018-0153573, filed on Dec. 3, 2018, each of which is hereby incorporated by reference for all purposes as if fully set forth herein.

BACKGROUND

Field

Exemplary embodiments of the invention relate generally to a light emitting module and a lens, and, more specifically, to a light emitting module and a lens, which can define a light emission distribution emitted outside.

Discussion of the Background

A light emitting diode is an inorganic semiconductor device that emits light through recombination of electrons and holes. Light emitting diodes are recently used in various technical fields, such as displays, vehicular lamps, general lighting, and the like. With various advantages, such as longer lifespan, lower power consumption, and higher response rate than conventional light sources, light emitting diodes are replacing conventional light sources.

A display apparatus or general lighting may employ several to dozens of such light emitting diodes. In a display apparatus including a large number of light emitting diodes, it is important to have light emitted from the light emitting diodes to be uniformly emitted through a light emission surface of the display apparatus. If uniform emission of light through the light emission surface is not achieved, interference of light emitted from the light emitting diodes can occur, which may generate dark portions or bright portions.

The above information disclosed in this Background section is only for understanding of the background of the inventive concepts, and, therefore, it may contain information that does not constitute prior art.

SUMMARY

Light emitting modules and lens constructed according to exemplary embodiments of the invention are capable of uniformly emitting light generated from each of light emitting devices through a light emission surface of a display apparatus.

Additional features of the inventive concepts will be set forth in the description which follows, and in part will be apparent from the description, or may be learned by practice of the inventive concepts.

A light emitting module according to an exemplary embodiment includes: a light emitting device; and a lens disposed above the light emitting device and dispersing light emitted from the light emitting device, in which the lens includes a light incident portion through which light emitted from the light emitting device enters the lens and a light exit portion through which the light exits the lens, each of the light incident portion and the light exit portion having a major axis and a minor axis in plan view, the major axis of the light incident portion being disposed at a right angle with respect to the major axis of the light exit portion, and a lower surface of the lens includes a slanted surface downwardly slanted with respect to a horizontal surface thereof in an outward direction of the lens.

The lens may have a protruding surface protruding from the lower surface thereof to have a predetermined radius of curvature.

The slanted surface may be disposed outside the protruding surface.

The light incident portion may have an upwardly concave part formed on the protruding surface of the lens, and an inner surface of the concave part of the light incident portion may include a vertical light incident facet extending from the protruding surface of the lens and an oblique light incident facet extending from the vertical incident facet.

The slanted surface may be downwardly slanted with respect to the horizontal surface in the outward direction of the lens along the major axis of the light exit portion.

A boundary between the slanted surface and the lower surface of the lens may be a straight line.

The light incident portion may be concavely formed in an upward direction on the lower surface of the lens, an inner surface of the light incident portion may be a light incident surface through which light emitted from the light emitting device enters the lens, and the light incident surface may include at least one protruding light incident facet protruding from a slanted surface of the light incident surface in an inward direction of the concave light incident portion.

The at least one protruding light incident facet may be disposed on the slanted surface of the light incident portion in a major axis direction thereof.

The protruding light incident facets disposed on the slanted surface of the light incident portion may be placed at opposite locations with respect to a horizontal direction of the lens.

The protruding light incident facet may be provided in plural and the plural protruding light incident facets may be disposed in a region of the slanted surface of the light incident portion having a larger area between a major axis direction and a minor axis direction of the light incident portion.

The plural protruding light incident facets disposed on the slanted surface of the light incident portion may include three protruding light incident facets disposed on one surface and one of the three protruding light incident facets may have a larger size than the other protruding light incident facets.

The lens may further include a plurality of legs formed on the lower surface of the lens to support the lens.

At least one of the legs may be formed with a leg protrusion protruding downwards from a lower surface thereof.

The leg protrusion may have a smaller width than that of the leg.

The lens may further include a flange connecting the light exit portion to the lower surface of the lens.

The flange may have a greater thickness in the major axis of the light exit portion than in the minor axis of the light exit portion.

A lens according to another exemplary embodiment includes: a light incident portion through which light emitted from a light emitting device enters the lens, the light incident portion being formed in a concave shape at a lower portion of the lens; and a light exit portion through which light having entered the lens through the light incident portion exits the lens, in which each of the light incident portion and the light exit portion has a major axis and a minor axis in plan view, the major axis of the light incident portion being disposed at a right angle with respect to the major axis of the light exit portion, and a lower surface of the lens includes a slanted surface downwardly slanted with respect to a horizontal surface thereof in an outward direction of the lens.

The lens may further include a protruding surface protruding from the lower surface thereof to have a predetermined radius of curvature.

The protruding surface may be disposed to surround the light incident portion.

The slanted surface may be disposed outside the protruding surface.

The slanted surface may be downwardly slanted with respect to the horizontal surface in the outward direction of the lens along the major axis of the light exit portion.

An inner surface of the light incident portion may be a light incident surface through which light emitted from the light emitting device enters the lens, and the light incident surface may include at least one protruding light incident facet protruding from a slanted surface of the light incident surface in an inward direction of the concave light incident portion.

The at least one protruding light incident facet may be disposed on the slanted surface of the light incident portion in a major axis direction thereof.

A light emitting module according to still another exemplary embodiment includes: a light emitting device; and a lens disposed above the light emitting device and dispersing light emitted from the light emitting device, in which the lens includes a light incident portion through which light emitted from the light emitting device enters the lens and a light exit portion through which the light exits the lens, each of the light incident portion and the light exit portion having a major axis and a minor axis in plan view, the major axis of the light incident portion being disposed at a right angle with respect to the major axis of the light exit portion, the light incident portion is concavely formed in an upward direction on a lower surface of the lens, an inner surface of the light incident portion is a light incident surface through which light emitted from the light emitting device enters the lens, and the light incident surface includes a plurality of protruding light incident facets protruding from a slanted surface of the light incident surface in an inward direction of the concave light incident portion.

The plurality of protruding light incident facets may include at least one protruding light incident facet disposed in a region of the slanted surface of the light incident portion having a larger area between a major axis direction and a minor axis direction of the light incident portion and may be disposed on the slanted surface of the light incident surface.

The lens may further include: a flange disposed between the light exit surface and the lower surface of the lens; and at least one flange protrusion partially protruding from the flange in an outward direction of the lens.

A curved flange boundary may be formed between the flange and the light exit surface.

A backlight unit according to yet another exemplary embodiment includes at least one backlight module including: a substrate; a plurality of light emitting devices disposed on the substrate; and a plurality of lenses disposed on the light emitting devices, respectively, and dispersing light emitted from the light emitting devices, in which each of the lenses includes a light incident portion through which light emitted from the light emitting device enters the lens and a light exit portion through which the light exits the lens, each of the light incident portion and the light exit portion having a major axis and a minor axis in plan view, the major axis of the light incident portion being disposed at a right angle with respect to the major axis of the light exit portion, and a lower surface of the lens includes a slanted surface downwardly slanted with respect to a horizontal surface thereof in an outward direction of the lens.

The substrate may have a predetermined length and the plurality of lenses may be disposed such that the major axis of the light exit portion is perpendicular to a longitudinal direction of the substrate.

The backlight module may further include a reflective sheet reflecting a faction of light discharged through the lens in an upward direction and secured to the backlight module by the lens.

The reflective sheet may be secured to the backlight module by being brought into contact with the slanted surface of the lens.

A backlight unit according to further exemplary embodiment includes: a substrate; a plurality of light emitting devices disposed on the substrate; and a plurality of lenses disposed on the light emitting devices, respectively, and dispersing light emitted from the light emitting devices, in which each of the lenses includes a light incident portion through which light emitted from the light emitting device enters the lens and a light exit portion through which the light exits the lens, each of the light incident portion and the light exit portion having a major axis and a minor axis in plan view, the major axis of the light incident portion being disposed at a right angle with respect to the major axis of the light exit portion, the light incident portion is concavely formed in an upward direction on a lower surface of the lens, an inner surface of the light incident portion is a light incident surface through which light emitted from the light emitting device enters the lens, and the light incident surface includes a plurality of protruding light incident facets protruding from a slanted surface of the light incident surface in an inward direction of the concave light incident portion.

Each of the lenses may further include a plurality of legs formed on the lower surface of the lens to support the lens and at least one of the legs may be formed with a leg protrusion protruding downwards from a lower surface thereof.

The substrate may be formed with at least one substrate hole into which at least one of the legs is inserted.

The plurality of protruding light incident facets may include at least one protruding light incident facet disposed in a region of the slanted surface of the light incident portion having a larger area between a major axis direction and a minor axis direction of the light incident portion and may be disposed on the slanted surface of the light incident surface.

Each of the lenses may further include: a flange disposed between the light exit surface and the lower surface of the lens; and at least one flange protrusion partially protruding from the flange in an outward direction of the lens.

A curved flange boundary may be formed between the flange and the light exit surface.

A display apparatus according to still yet another exemplary embodiment includes at least one backlight module including: a substrate; a plurality of light emitting devices disposed on the substrate; and a plurality of lenses disposed on the light emitting devices, respectively, and dispersing light emitted from the light emitting devices, in which each of the lenses includes a light incident portion through which light emitted from the light emitting device enters the lens and a light exit portion through which the light exits the lens, each of the light incident portion and the light exit portion having a major axis and a minor axis in plan view, the major axis of the light incident portion being disposed at a right angle with respect to the major axis of the light exit portion, and a lower surface of the lens includes a slanted surface downwardly slanted with respect to a horizontal surface thereof in an outward direction of the lens.

The substrate may have a predetermined length and the plurality of lenses may be disposed such that the major axis of the light exit portion is perpendicular to a longitudinal direction of the substrate.

The backlight module may further include a reflective sheet reflecting a faction of light discharged through the lens in an upward direction and secured to the backlight module by the lens.

The reflective sheet may be secured to the backlight module by being brought into contact with the slanted surface of the lens.

A display apparatus according to yet another exemplary embodiment includes: a substrate; a plurality of light emitting devices disposed on the substrate; and a plurality of lenses disposed on the light emitting devices, respectively, and dispersing light emitted from the light emitting devices, in which each of the lenses includes a light incident portion through which light emitted from the light emitting device enters the lens and a light exit portion through which the light exits the lens, each of the light incident portion and the light exit portion having a major axis and a minor axis in plan view, the major axis of the light incident portion being disposed at a right angle with respect to the major axis of the light exit portion, the light incident portion is concavely formed in an upward direction on a lower surface of the lens, an inner surface of the light incident portion is a light incident surface through which light emitted from the light emitting device enters the lens, and the light incident surface includes a plurality of protruding light incident facets protruding from a slanted surface of the light incident surface in an inward direction of the concave light incident portion.

Each of the lenses may further include a plurality of legs formed on the lower surface of the lens to support the lens and at least one of the legs may be formed with a leg protrusion protruding downwards from a lower surface thereof.

The substrate may be formed with at least one substrate hole into which at least one of the legs is inserted.

The plurality of protruding light incident facets may include at least one protruding light incident facet disposed in a region of the slanted surface of the light incident portion having a larger area between a major axis direction and a minor axis direction of the light incident portion and may be disposed on the slanted surface of the light incident surface.

Each of the lenses may further include: a flange disposed between the light exit surface and the lower surface of the lens; and at least one flange protrusion partially protruding from the flange in an outward direction of the lens.

A curved flange boundary may be formed between the flange and the light exit surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
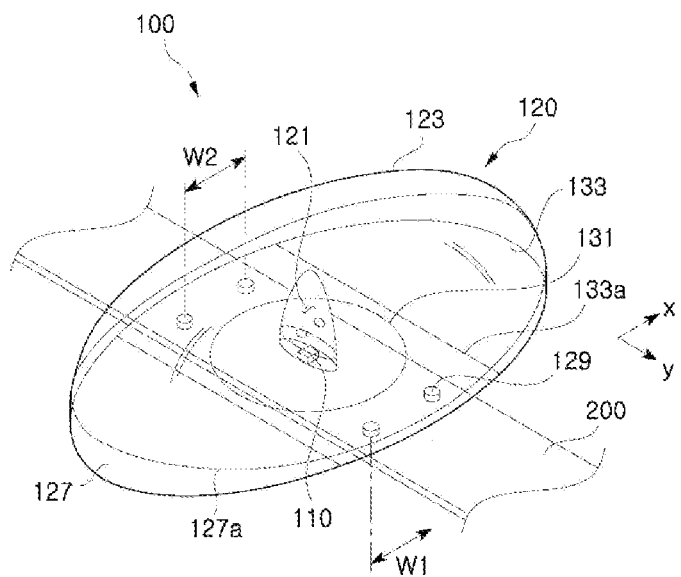
FIG. 1 is a perspective view of a light emitting module according to a first exemplary embodiment.

Hereinafter, embodiments of the present disclosure will be described in detail with reference to the accompanying drawings.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
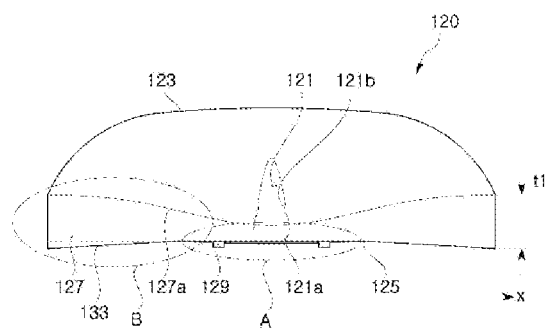
FIG. 2 is a cross-sectional view of a lens of the light emitting module according to the first exemplary embodiment, which is taken in a major axis direction of a light exit portion thereof.
Figure 3:
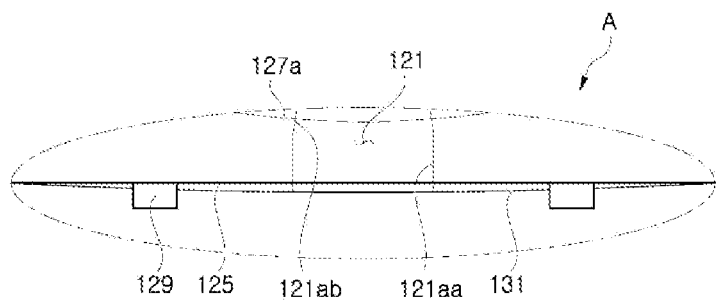
FIG. 3 is an enlarged view of region A in FIG. 2.
Figure 4:
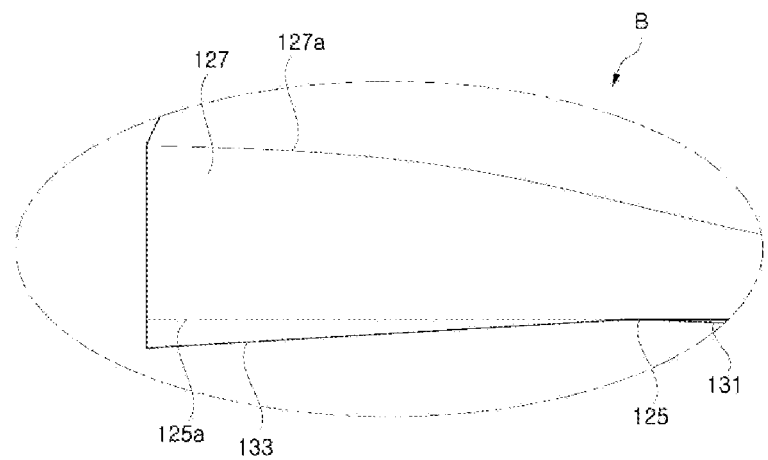
FIG. 4 is an enlarged view of region B in FIG. 2.
Figure 5:
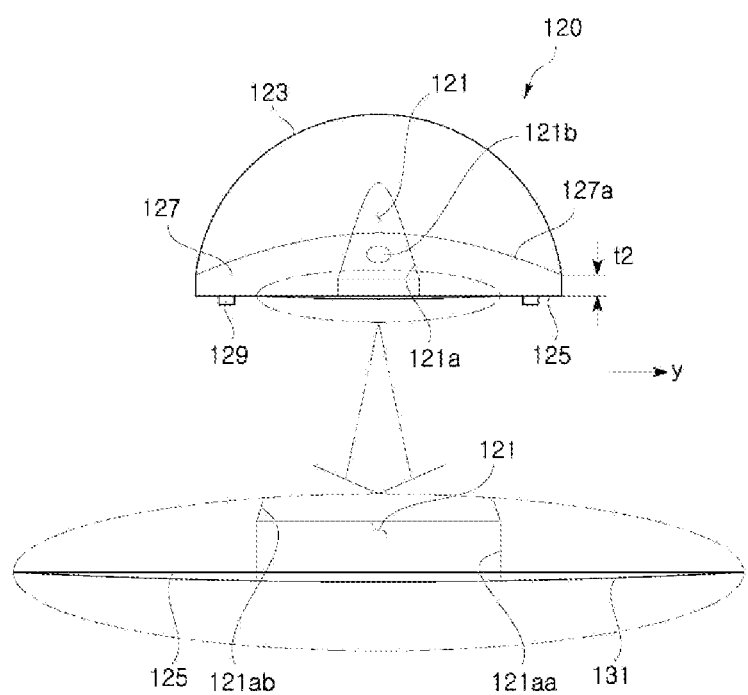
FIG. 5 is a cross-sectional view of the lens of the light emitting module according to the first exemplary embodiment, which is taken in a minor axis direction of the light exit portion thereof.

FIG. 1 is a perspective view of a light emitting module according to a first exemplary embodiment. FIG. 2 is a cross-sectional view of a lens of the light emitting module according to the first exemplary embodiment, which is taken in a major axis direction of a light exit portion thereof, and FIG. 3 is an enlarged view of region A in FIG. 2. FIG. 4 is an enlarged view of region B in FIG. 2. FIG. 5 is a cross-sectional view of the lens of the light emitting module according to the first exemplary embodiment, which is taken in a minor axis direction of the light exit portion thereof.

Referring to FIG. 1, a light emitting module 100 according to the first exemplary embodiment includes a light emitting device 110 and a lens 120.

The light emitting device 110 is mounted on a substrate 200. The substrate 200 may have insulating properties and includes a conductive circuit on an upper surface thereof. The substrate 200 supports the light emitting device 110 and the lens 120. According to the illustrated exemplary embodiment, the substrate 200 may be a printed circuit board and may have a mounting recess on which the light emitting device 110 is mounted.

The light emitting device 110 is mounted on the substrate 200. When the substrate 200 has the mounting recess, the light emitting device may be disposed in the mounting recess. The light emitting device 110 may be provided in the form of a package, in which a light emitting diode chip is mounted on a housing or a sub-substrate, or the light emitting diode chip may be directly mounted on the substrate 200.

The light emitting diode chip may include a light emitting structure that includes an n-type semiconductor layer, an active layer, and a p-type semiconductor layer. The light emitting diode chip may be a flip-chip type in which an n-type electrode electrically connected to the n-type semiconductor layer and a p-type electrode electrically connected to the p-type semiconductor layer are arranged in one direction, or a vertical type in which the n-type electrode and the p-type electrode are arranged in different directions. Each of the n-type semiconductor layer, the active layer and the p-type semiconductor layer may include III-V group-based compound semiconductor, for example, a nitride semiconductor, such as (Al, Ga, In)N.

The n-type semiconductor layer may be a conductive semiconductor layer including n-type dopants (for example, Si) and the p-type semiconductor layer may be a conductive semiconductor layer including p-type dopants (for example, Mg). The active layer may be interposed between the n-type semiconductor layer and the p-type semiconductor layer, and may have a multi-quantum well (MQW) structure. The composition of the active layer may be determined to emit light having a desired peak wavelength. In the light emitting diode chip according to the illustrated exemplary embodiment, the composition of the active layer may be determined to emit blue light or UV light.

The lens 120 is disposed to cover the light emitting device 110 and distributes light emitted from the light emitting device 110. To this end, the lens 120 may have a light incident surface 121a through which light emitted from the light emitting device 110 enters the lens 120, and a light exit portion 123 through which the light exits the lens 120. According to the illustrated exemplary embodiment, the lens 120 includes a concave light incident portion 121 formed at a lower portion thereof, and an inner surface of the light incident portion 121 may be the light incident surface 121a.

As shown in the drawings, the light incident portion 121 may be formed at the lower portion of the lens 120 and may be disposed at the center of the lens 120. The light incident portion 121 may have a concave shape, for example, a bell shape, as shown in the drawings. In addition, the light incident portion 121 may have an elliptical cross-section having a major axis in the y-axis direction. In the illustrated exemplary embodiment, a minor axis direction of the light incident portion 121 will be defined as the x-axis direction and a major axis direction of the light incident portion 121 will be defined as the y-axis direction.

The light incident surface 121a corresponding to the inner surface of the light incident portion 121 may have a generally curved surface, and may include a vertical light incident facet 121aa disposed at a lower portion of the light incident portion 121 and an oblique light incident facet 121ab disposed at an upper portion of the vertical light incident facet 121aa.

The vertical light incident facet 121aa is formed from an inlet of the light incident portion 121 to a predetermined height so as to be perpendicular to a horizontal surface of the lens. The oblique light incident facet 121ab is placed at the upper portion of the vertical light incident facet 121aa and may have a curved surface. The vertical light incident facet 121aa and a protruding surface 131 of the lens 120 may be extended.

According to the illustrated exemplary embodiment, the oblique light incident facet 121ab may be formed with protruding light incident facets 121b. The protruding light incident facets 121b may be disposed on the oblique light incident facet 121ab and protrude in an inward direction of the light incident portion 121. The protruding light incident facets 121b may have substantially an elliptical shape or may be formed in a curved protrusion shape.

As shown in FIG. 1 and FIG. 2, a pair of protruding light incident facets 121b may be disposed at opposite locations with respect to the minor axis (x-direction) of the light incident portion 121. As described above, since the light incident portion 121 is formed in an elliptical shape having a major axis in the y-axis direction and a minor axis in the x-axis direction, the light incident surface 121a formed in the y-axis direction may have a larger area than the light incident surface 121a formed in the x-axis direction. The protruding light incident facets 121b may be formed in a region of the light incident surface 121a having a relatively large area and may change an optical path of light that enters the lens 120 through the protruding light incident facets 121b.

Although FIG. 2 illustrates a pair of protruding light incident facets 121b, the inventive concepts are not limited to a particular number of protruding light incident facets 121b formed on the oblique light incident facet 121ab. For example, the number of protruding light incident facets 121b formed on the oblique light incident facet 121ab may be increased. In addition, although the protruding light incident facets 121b are illustrated as being formed on the oblique light incident facet 121ab, in other exemplary embodiments, the protruding light incident facets 121b may be formed on the vertical light incident facet 121aa. Alternatively, the protruding light incident facets 121b may be formed on both of the vertical light incident facet 121aa and the oblique light incident facet 121ab.

A lower surface 125 of the lens 120 may have substantially a flat surface. The lower surface 125 of the lens 120 may be formed with the protruding surface 131 around the inlet of the light incident portion 121. As shown in FIG. 3, the protruding surface 131 may be formed in a semispherical shape coupled to the lower surface 125 of the lens 120. More particularly, the protruding surface 131 is formed by coupling a cut portion of a spherical shape to the lower surface 125 of the lens 120 and may protrude from the lower surface 125 of the lens 120, as shown in FIG. 3 and FIG. 5.

The light incident portion 121 may be disposed at the center of the protruding surface, and the vertical light incident facet 121aa of the light incident portion 121 may be connected to the protruding surface 131. The center of the protruding surface 131 may be coincident with the center of the light incident portion 121 when viewed in plan.

Further, the lower surface 125 of the lens 120 may be formed with a slanted surface 133. Referring to FIG. 4, the slanted surface 133 may be formed in an outer region of the lower surface 125 of the lens 120 in the major axis direction (x-direction) thereof and may be slanted downwardly in an outward direction of the lens 120. In this manner, a vertical distance between the slanted surface 133 and an imaginary lower surface 125a extending from the lower surface 125 of the lens 120 in the horizontal direction may be increased towards the outward direction of the lens 120.

Although the slanted surface 133 is illustrated as being straight in FIG. 2 and FIG. 4, in some exemplary embodiments, the slanted surface 133 may have a convex shape or a concave shape.

Referring back to FIG. 1, the slanted surface 133 is disposed in the outer region of the lower surface of the lens in the major axis direction of the lens 120 and a slanted surface boundary 133a may be formed between the lower surface 125 of the lens 120 and the slanted surface 133. Although the slanted surface boundary 133a according to the illustrated exemplary embodiment is formed to have a straight shape, in some exemplary embodiments the slanted surface boundary 133a may be formed in a curved shape. Furthermore, in some exemplary embodiments, the slanted surface boundary 133a may be formed in the light exit portion 123 along the minor axis direction (y-axis direction) of the of the lens 120. Accordingly, the slanted surface 133 is formed in the major axis direction of the light exit portion 123 of the lens 120 in the cross-sectional view of FIG. 2, whereas the slanted surface 133 is not formed in the minor axis direction of the light exit portion 123 of the lens 120 in the cross-sectional view of FIG. 5.

The slanted surface 133 is disposed outside the protruding surface 131. However, in some exemplary embodiments, the slanted surface 133 may partially overlap the protruding surface 131.

The slanted surface 133 allows light reflected by an inner surface of the light exit portion 123 of the lens 120 or by an inner surface of a flange 127 to be reflected back towards the light exit portion 123 or the flange 127.

The light exit portion 123 corresponds to a surface through which light having entered the lens 120 exits the lens 120, and defines an external appearance of the lens 120. A cross-section of the light exit portion 123 may have an elliptical shape having a major axis in the x-axis direction or may have a combined shape of a curved line and a straight line. In the light exit portion 123 having an elliptical cross-sectional shape according to the illustrated exemplary embodiment, the minor axis direction of the light exit portion 123 corresponds to the y-axis direction and the major axis direction of the light exit portion 123 corresponds to the x-axis direction. That is, the major axis direction of the light incident portion 121 may be orthogonal to the major axis direction of the light exit portion 123.

The elliptical shape of the light incident portion 121 may have a greater ratio between major axis and minor axis than the elliptical shape of the light exit portion 123. That is, the elliptical shape of the light exit portion 123 may have a more circular shape than the elliptical shape of the light incident portion 121. In this manner, the light incident portion 121 allows light having entered the lens 120 through the light incident portion 121 of the lens 120 in the minor axis direction of the light incident portion 121 to spread more broadly than light having entered the lens 120 therethrough in the major axis direction of the light incident portion 121 when discharged from the lens 120.

According to the illustrated exemplary embodiment, the lens 120 may further include the flange 127, which connects the light exit portion 123 to the lower surface 125 of the lens 120. The flange 127 may be disposed along an outer periphery of the light exit portion 123, and a longitudinal cross-section of the flange 127 may be perpendicular to the lower surface 125 of the lens 120. The flange 127 may have a varying thickness depending upon the location of the light exit portion 123. According to the illustrated exemplary embodiment, thickness t1 of the flange 127 in the major axis direction of the light exit portion 123 may be greater than thickness t2 of the flange 127 in the minor axis direction of the light exit portion 123. Further, the flange 127 may have the greatest thickness in the major axis direction of the light exit portion 123, and the smallest thickness in the minor axis direction of the light exit portion 123. A flange boundary 127a between the flange 127 and the light exit portion 123 may be formed in a curved shape, as shown in FIG. 1 to FIG. 5. However, the shape of the flange boundary 127a between the flange 127 and the light exit portion 123 of the lens 120 is not limited to the curved shape and may have a straight shape in other exemplary embodiments.

A plurality of legs 129 may be disposed on the lower surface 125 of the lens 120. The legs 129 may be disposed around the light incident portion 121, may have a predetermined thickness, and may be used as a reference for suitable mounting of the lens 120 when the lens 120 is coupled to the substrate 200.

The plurality of legs 129 may be linearly arranged in the major axis direction of the light incident portion 121. More particularly, four legs 129 are disposed on the lower surface of the lens 120 according to the illustrated exemplary embodiment, such that a pair of legs 129 is disposed at one side of the light incident portion 121 in the major axis direction thereof to have a first pitch W1 therebetween, and the other pair of legs 129 is disposed at the other side of the light incident portion 121 in the major axis direction thereof to have a second pitch W2 therebetween. The first pitch W1 may be the same as the second pitch W2. Furthermore, a distance between the pair of legs 129 disposed at one side of the light incident portion 121 and the pair of legs 129 disposed at the other side of the light incident portion 121 may be greater than the first and second pitches W1, W2.

The plurality of legs 129 may be disposed outside the protruding surface 131 formed on the lower surface 125 of the lens 120 and inside the slanted surface 133 formed on the lower surface 125 of the lens 120. In particular, the plurality of legs 129 may be disposed between the protruding surface 131 and the slanted surface 133 to be placed on the flat lower surface 125. However, the inventive concepts are not limited thereto, and may be disposed on the slanted surface 133 in other exemplary embodiments.

Figure 6A:
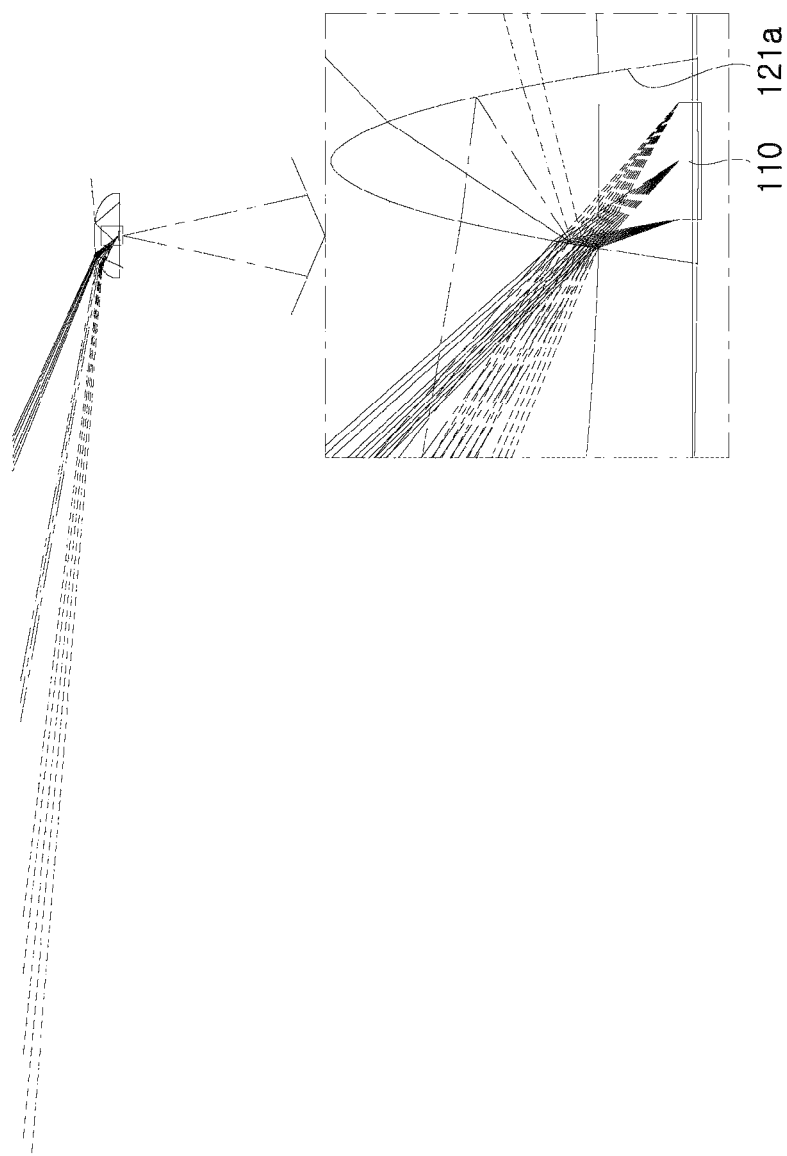
FIG. 6A and FIG. 6B are views illustrating an optical path of light emitted from a light emitting module according to a comparative embodiment and that from the light emitting module according to the first exemplary embodiment.
Figure 6B:
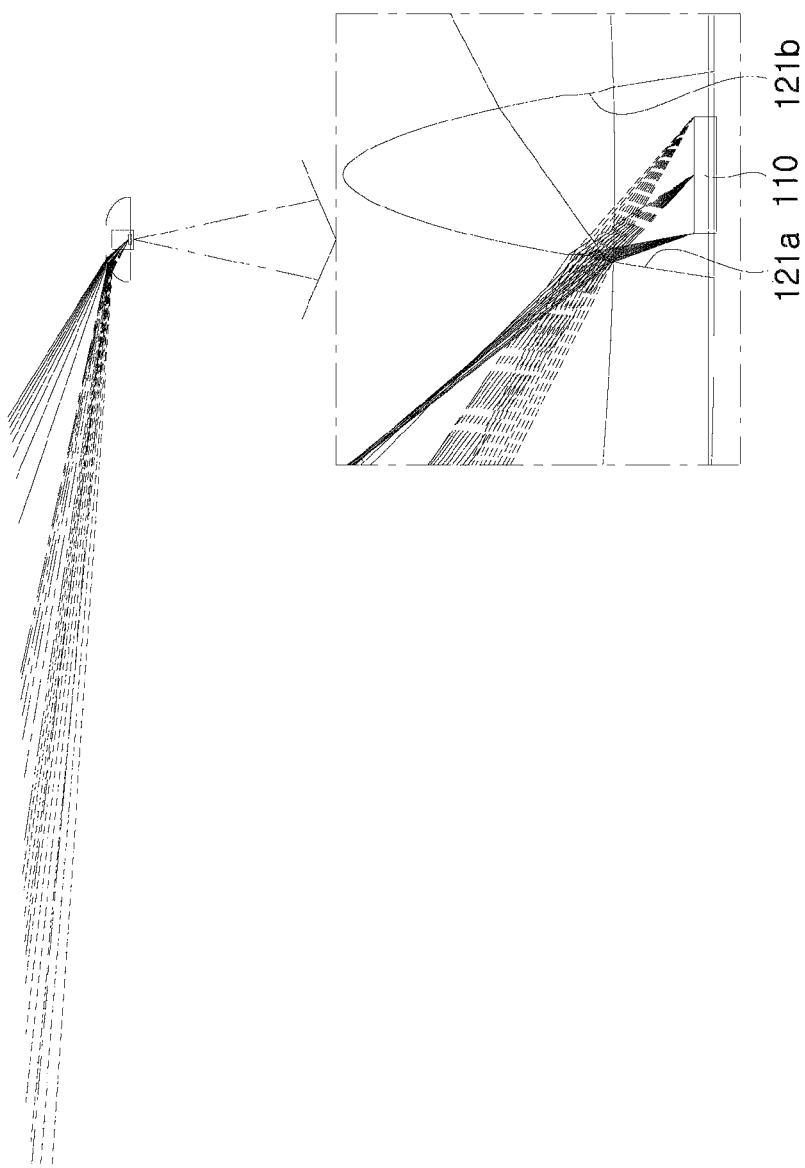

FIG. 6A and FIG. 6B are views illustrating an optical path of light emitted from a light emitting module according to a comparative embodiment, and that emitted from the light emitting module according to the first exemplary embodiment.

FIG. 6A shows an optical path of light in the lens 120 of the light emitting module 100 according to a comparative embodiment, in which the protruding light incident facet 121*b* is not formed on the light incident portion 121 of the lens 120. FIG. 6B shows an optical path of light in the lens 120 of the light emitting module 100 according to the first exemplary embodiment, in which the protruding light incident facet 121*b* is formed on the light incident portion 121 of the lens 120.

As shown in FIG. 6A, when light emitted from each of a central portion, a left portion, and a right portion of the light emitting device 110 enters the lens 120 through the light incident surface 121*a* and discharged from the lens 120 through the light exit portion 123, light emitted from one portion of the light emitting device 110 may be separated from the light emitted from the other portions thereof.

When the lens 120 includes the protruding light incident facets 121*b* on the light incident surface 121*a* according to the first exemplary embodiment, light may enter the lens 120 along different optical paths, as shown in FIG. 6B. In this manner, distribution of light emitted from the lens 120 through the light exit portion 123 of the lens 120 can be changed. Accordingly, when the protruding light incident facets 121*b* are formed on the light incident surface 121*a* of the lens 120, leaning of light emitted from the lens 120 toward a particular location may be minimized and change the optical path of light to evenly distribute light as shown in FIG. 6B. Furthermore, it is possible to minimize light that has been emitted from the light emitting device 110 but does not enter the lens 120 through the light incident surface 121*a* to be reflected.

Figure 7A:
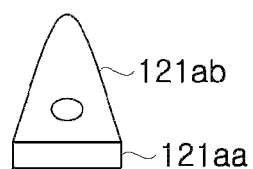
FIG. 7A, FIG. 7B, and FIG. 7C are views of a light incident portion of the lens of the light emitting module according to exemplary embodiment of the present disclosure.
Figure 7B:
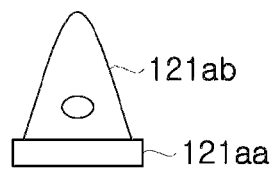
Figure 7C:
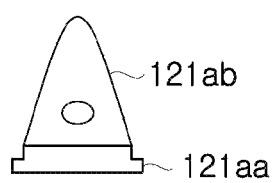

FIG. 7A to FIG. 7C are views of the light incident portion of the lens of the light emitting module according to exemplary embodiments.

According to exemplary embodiments, the light incident portion 121 of the lens 120 of the light emitting module 100 may have various configurations, as shown in FIG. 7A to FIG. 7C.

Referring to FIG. 7A, the oblique light incident facet 121*ab* may be connected to an upper portion of the vertical light incident facet 121*aa*. In this case, the oblique light incident facet 121*ab* may extend from an upper end of the vertical light incident facet 121*aa*.

Referring to FIG. 7B, the vertical light incident facet 121*aa* may have a greater width than that of the oblique light incident facet 121*ab*. More particularly, the vertical light incident facet 121*aa* may extend from the inlet of the light incident portion 121 in a horizontal direction to form a step in the light incident portion 121. In this manner, when light enters the lens through the light incident portion 121, light may enter the lens 120 through the step formed between the vertical light incident facet 121*aa* and the oblique light incident facet 121*ab*.

Referring to FIG. 7C, a step may be formed on the vertical light incident facet 121*aa*. More particularly, a lower portion of the vertical light incident facet 121*aa* may be formed have a predetermined height from the inlet of the light incident portion 121 and an upper portion of the vertical light incident facet 121*aa* may be further formed from an upper side of the lower portion of the vertical light incident facet 121*aa* to have the step on the light incident portion 121. The oblique light incident facet 1211*ab* may be formed on an upper surface of the upper portion of the vertical light incident facet 121*aa*. In this manner, the vertical light incident facet 121*aa* may be include two portions that form a step therebetween to change the optical path of light entering the lens 120.

As such, the optical path of light entering the lens 120 may be changed through modification of the light incident surface, thereby preventing generation of dark portions or bright portions in some zones by changing distribution of light discharged through the light exit portion 123 of the lens 120.

Figure 8:
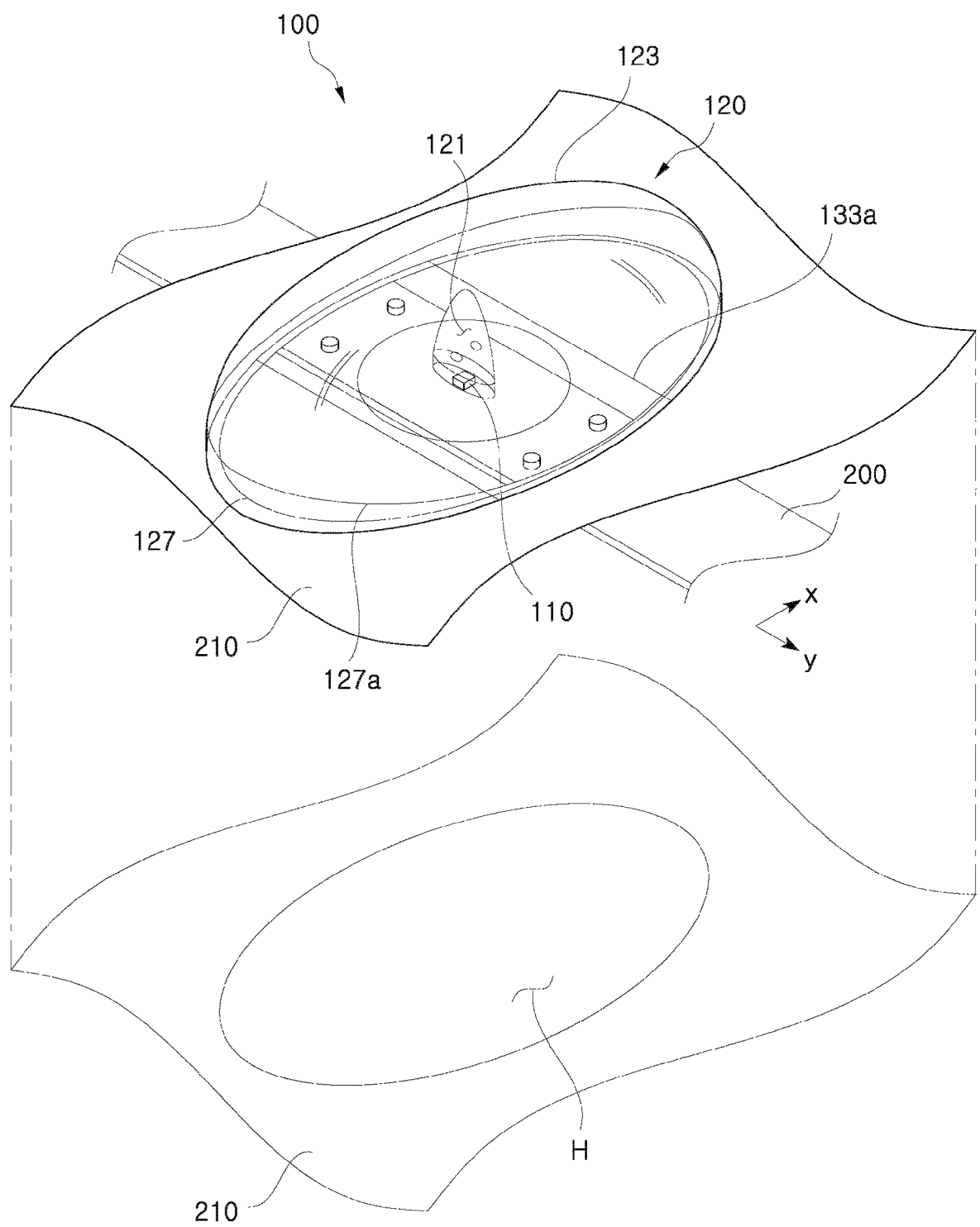
FIG. 8 is a perspective view illustrating a coupling relationship between the light emitting module according to the first exemplary embodiment and a reflective sheet.
Figure 9:
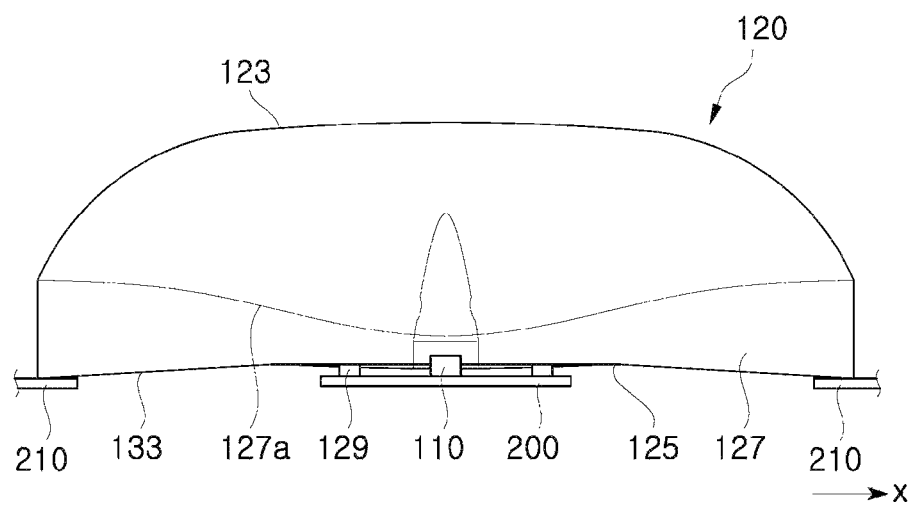
FIG. 9 is a cross-sectional view of the lens taken in the major axis direction of the light exit portion thereof, illustrating the coupling relationship between the light emitting module according to the first exemplary embodiment and the reflective sheet.

FIG. 8 is a perspective view illustrating a coupling relationship between the light emitting module according to the first exemplary embodiment and a reflective sheet, and FIG. 9 is a cross-sectional view of the lens taken in the major axis direction of the light exit portion thereof, illustrating the coupling relationship between the light emitting module according to the first exemplary embodiment and the reflective sheet.

According to the illustrated exemplary embodiment, a reflective sheet 210 may be coupled to a lower side of the light emitting module 100. The reflective sheet 210 may be disposed under the light emitting module 100 to reflect light emitted from the light emitting module 100 and incident on the reflective sheet 210 in an upward direction. In general, a reflective sheet is disposed under the light emitting module to be secured to a backlight unit to which the substrate 200 is secured, by a bonding agent or a bonding sheet. According to the illustrated exemplary embodiment, the reflective sheet 210 may be secured to the backlight unit 300 (see FIG. 11) using the lens 120 instead of using the bonding agent or the bonding sheet.

As described above, the lens 120 of the light emitting module 100 according to the first exemplary embodiment has the slanted surface 133 downwardly slanted on the lower surface 125 of the lens 120 in the outward direction of the lower surface 125. The reflective sheet 210 is disposed under the light emitting module 100 to be secured to the backlight unit 300 (see FIG. 11) using the downwardly slanted surface 133 of the lens 120.

As shown in FIG. 8, the reflective sheet 210 may be formed with a positioning hole H at a location where the light emitting module 100 is to be placed. In this manner, the reflective sheet 210 is disposed under the lens 120 of the light emitting module 100 while being placed above the substrate 200. In this case, the positioning hole H formed in the reflective sheet 210 may have a smaller size than the lens 120 included in the light emitting module 100.

When the positioning hole H of the reflective sheet 210 has a smaller size than the lens 120, the reflective sheet 210 may be compressed by the lens 120 to be secured to a backlight unit 300 without using a bonding agent or a bonding sheet. In this case, a portion of the slanted surface 133 of the lens 120 may be brought into contact with the reflective sheet 210 to secure the reflective sheet 210 thereto.

Figure 10:
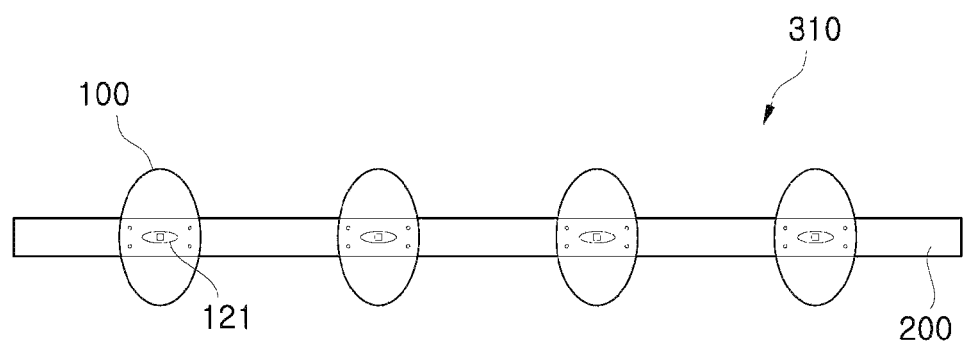
FIG. 10 is a view of a backlight module including the light emitting modules according to the first embodiment mounted on a substrate.
Figure 11:
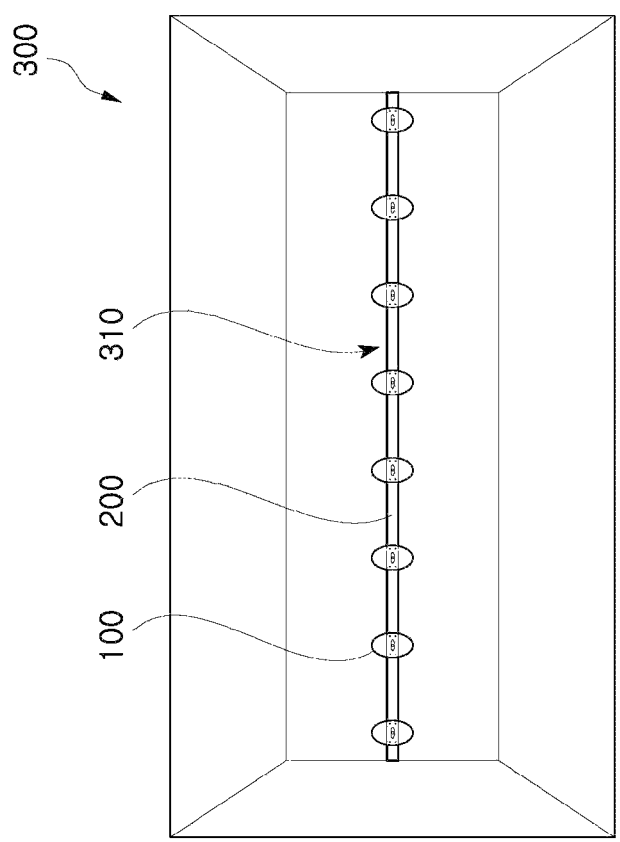
FIG. 11 is a view of a backlight module of a 32-inch display apparatus including the light emitting modules according to the first exemplary embodiment.

FIG. 10 is a view of a backlight module including the light emitting module according to the first exemplary embodiment mounted on a substrate, and FIG. 11 is a view of a backlight module of a 32-inch display apparatus including the light emitting module according to the first exemplary embodiment.

Referring to FIG. 10, a backlight module 310 includes a substrate 200 and a plurality of light emitting modules 100 disposed on the substrate 200. The substrate 200 may have a bar shape extending in the longitudinal direction thereof, and may be formed with a conductive circuit to supply power to the light emitting devices 110 mounted on an upper surface thereof. With the plurality of light emitting devices 110 connected to the conductive circuit of the substrate 200, the lens 120 is disposed to cover the plurality of light emitting devices 110, thereby forming the light emitting module 100.

As shown in FIG. 10, the lens 120 may be disposed on the substrate 200 such that the major axis direction of the light incident portion 121 is coincident with the longitudinal direction of the substrate 200. In this manner, the major axis of the light exit portion 123 of the lens 120 may be perpendicular to the longitudinal direction of the substrate 200, and the lens 120 may protrude outside of the substrate 200. In addition, the light incident portion 121 of the lens 120 in the minor axis direction may have a smaller width than that of the substrate 200. Further, the legs 129 of the lens 120 may be coupled to the substrate 200 such that the lens 120 can be coupled to the substrate 200.

Referring to FIG. 11, a backlight unit 300 of the 32-inch display apparatus may include the backlight module 310. The backlight module 310 may include a plurality of light emitting modules 100 arranged at constant intervals on the substrate 200 having a predetermined length.

The backlight unit 300 may be provided with one backlight module 310. The backlight module 310 may be disposed at the center of the backlight unit 300 in the longitudinal direction of the backlight unit 300. In this manner, light emitted from the plurality of light emitting modules 100 travels in a perpendicular direction with respect to the longitudinal direction of the substrate 200, such that a front side of the backlight unit 300 can be illuminated.

Although the backlight module 310 is exemplarily illustrated as being employed in the 32-inch display apparatus according to the illustrated exemplary embodiment, other display apparatuses having a larger size may employ the backlight module 310. When a display apparatus employs a plurality of backlight modules 310, the backlight modules 310 may be disposed in a perpendicular direction with respect to the longitudinal direction of the backlight unit 300. The plurality of backlight modules 310 may be arranged at constant intervals.

Figure 12A:
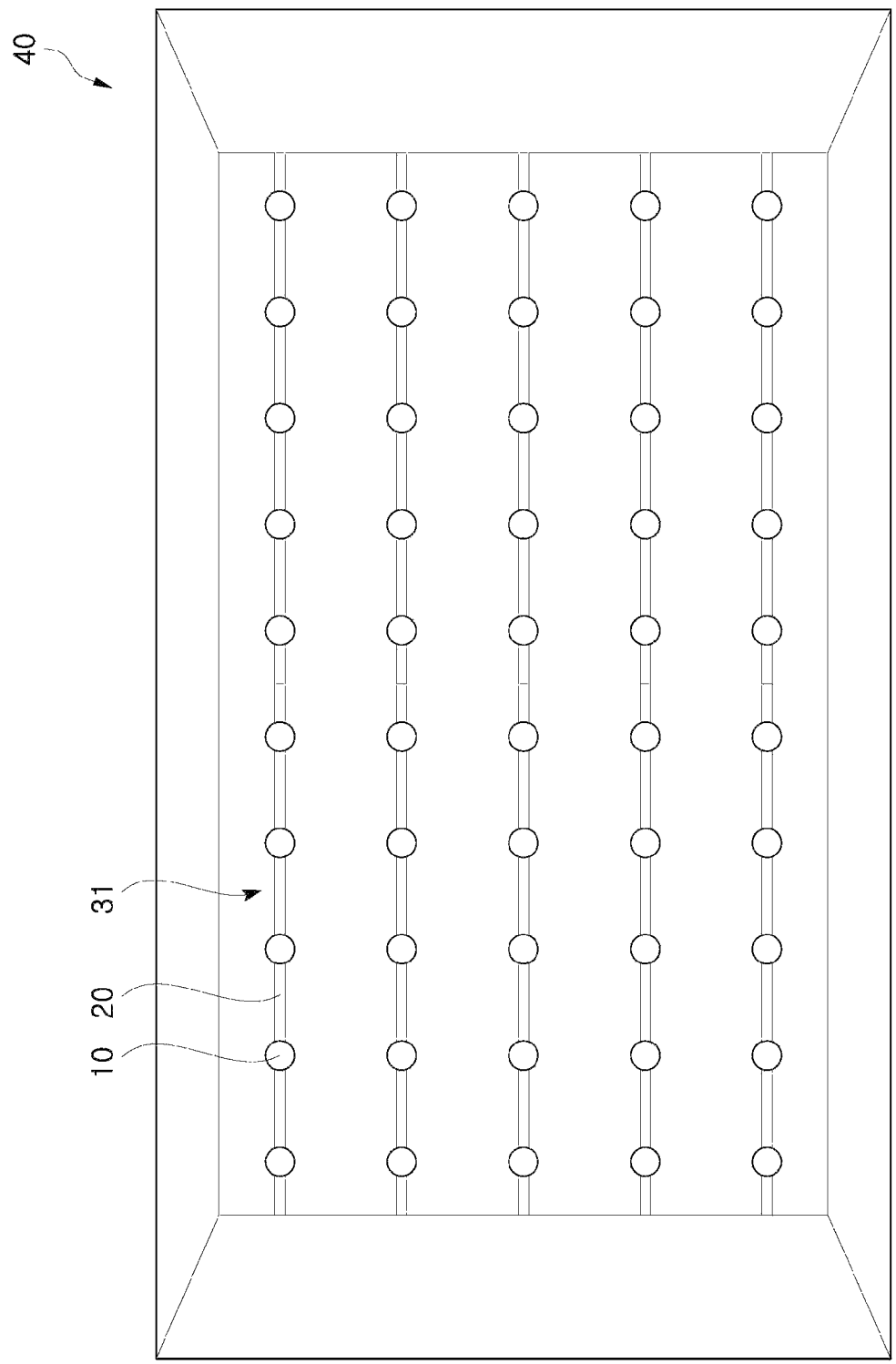
FIG. 12A and FIG. 12B are views illustrating a backlight unit of a 55-inch display apparatus including conventional light emitting modules and a backlight unit of a 55-inch display apparatus including the light emitting modules according to the first exemplary embodiment.
Figure 12B:
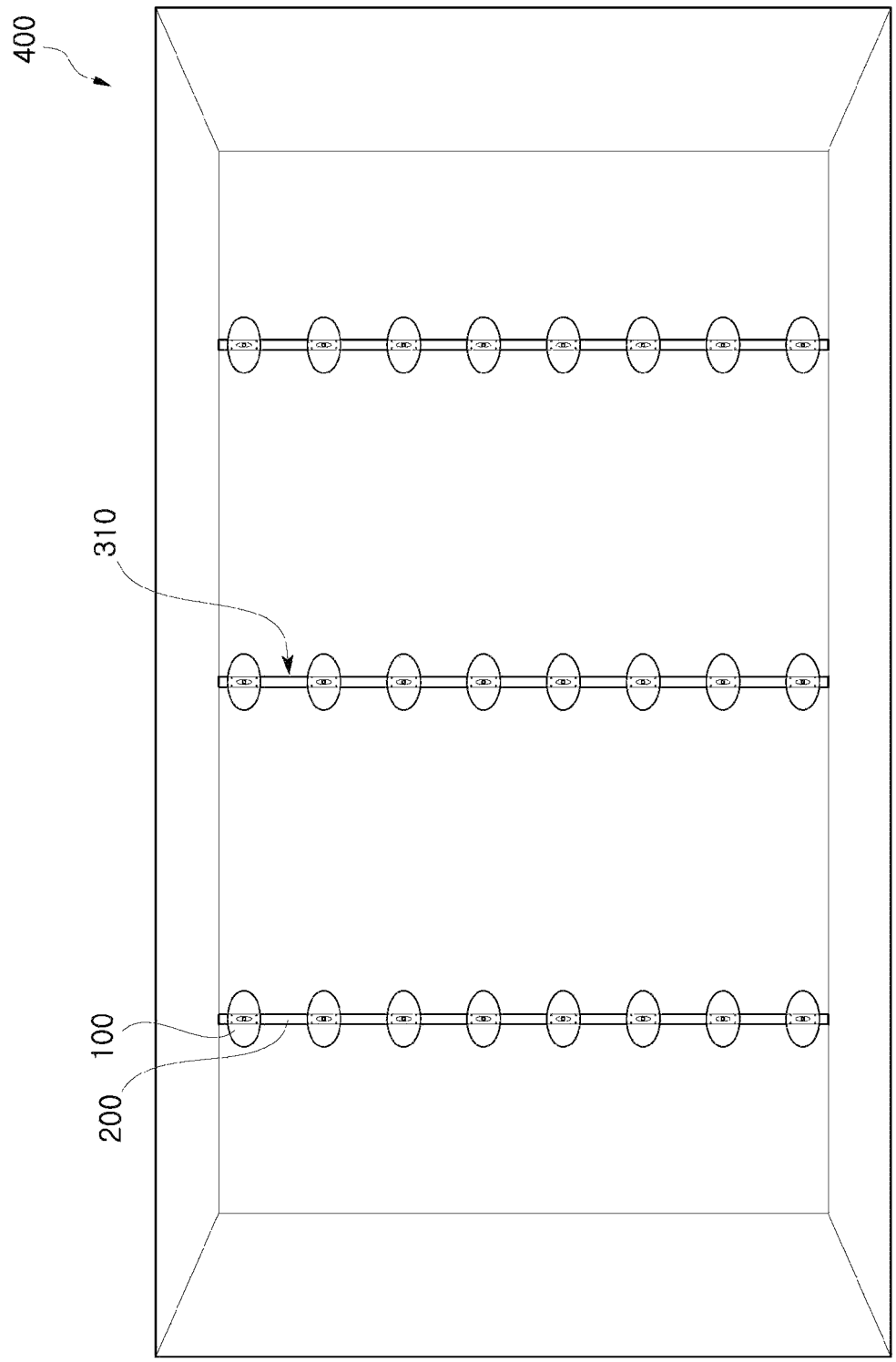

FIG. 12A and FIG. 12B are views illustrating a backlight unit of a 55-inch display apparatus including conventional light emitting modules and a backlight unit of a 55-inch display apparatus including the light emitting modules according to the first exemplary embodiment.

Referring to FIG. 12A, in a backlight unit 40 of a 55-inch display apparatus employing conventional light emitting modules, ten backlight modules 31 are arranged in five columns. The ten backlight modules 31 are disposed in the longitudinal direction of the backlight unit, such that two backlight modules 31 are arranged in each column.

Further, each of the backlight modules 31 includes one substrate 20 and five light emitting modules 10, each of which includes a circular lens. As such, the front side of the backlight unit 40 may be illuminated with light emitted from each of the backlight modules 31.

On the other hand, referring to FIG. 12B, in a backlight unit 400 of a 55-inch display apparatus provided with the light emitting modules 100 according to the illustrated exemplary embodiment, three backlight modules 310 are disposed in the perpendicular direction with respect to the longitudinal direction of the backlight unit 400. As shown in the drawings, each of the backlight modules 310 includes a substrate 200 extending in one direction and a plurality of light emitting modules 100 disposed on the substrate 200. In this manner, the backlight module 310 extends in one direction as in the substrate 200. On the backlight unit 400 of the 55-inch display apparatus, the three backlight modules 310 may be arranged in the perpendicular direction with respect to the longitudinal direction of the backlight unit 400.

In each of the backlight modules 310, light emitted from the plurality of light emitting modules 100 on one substrate 200 travels in the perpendicular direction with respect to the longitudinal direction of the substrate 200, such that the front side of the backlight unit 400 can be illuminated.

According to the illustrated exemplary embodiment, the backlight unit 40 employing the backlight modules 310 can achieve significant reduction in the number of light emitting modules 100 as compared with the backlight unit including the conventional backlight modules.

In some exemplary embodiments, the number of backlight modules 310 disposed on each of the backlight units 300, 400 and the number of light emitting modules 100 disposed on the substrate 200 may be changed depending on the size of the display apparatus.

Figure 13:
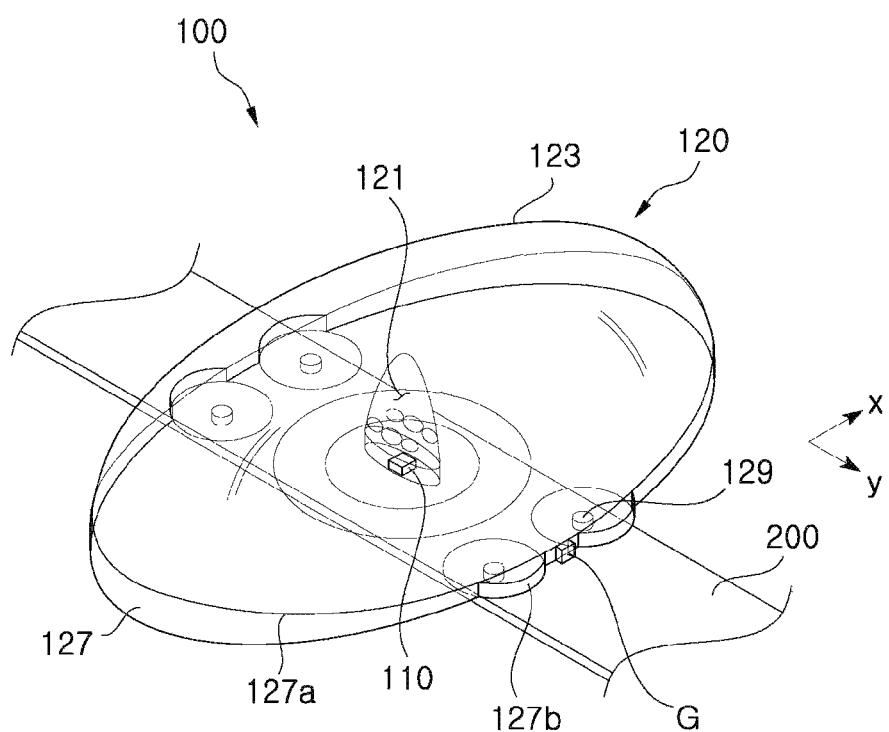
FIG. 13 is a perspective view of a light emitting module according to a second exemplary embodiment.
Figure 14:
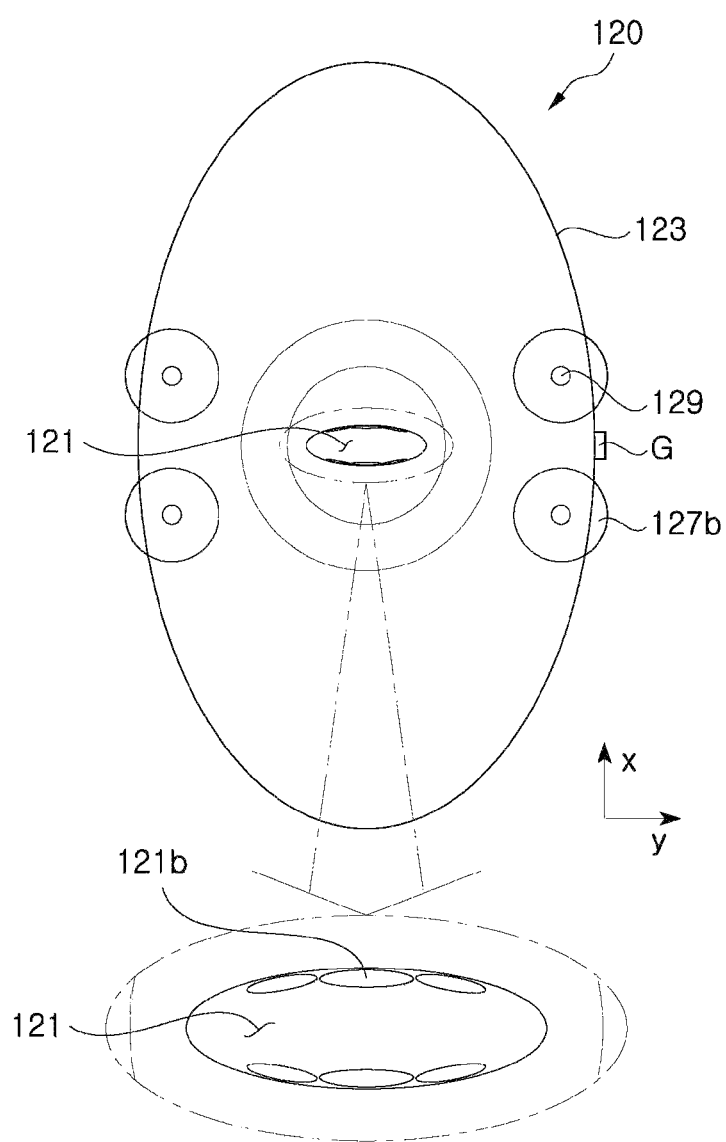
FIG. 14 is a plan view of a lens of the light emitting module according to the second exemplary embodiment.
Figure 15:
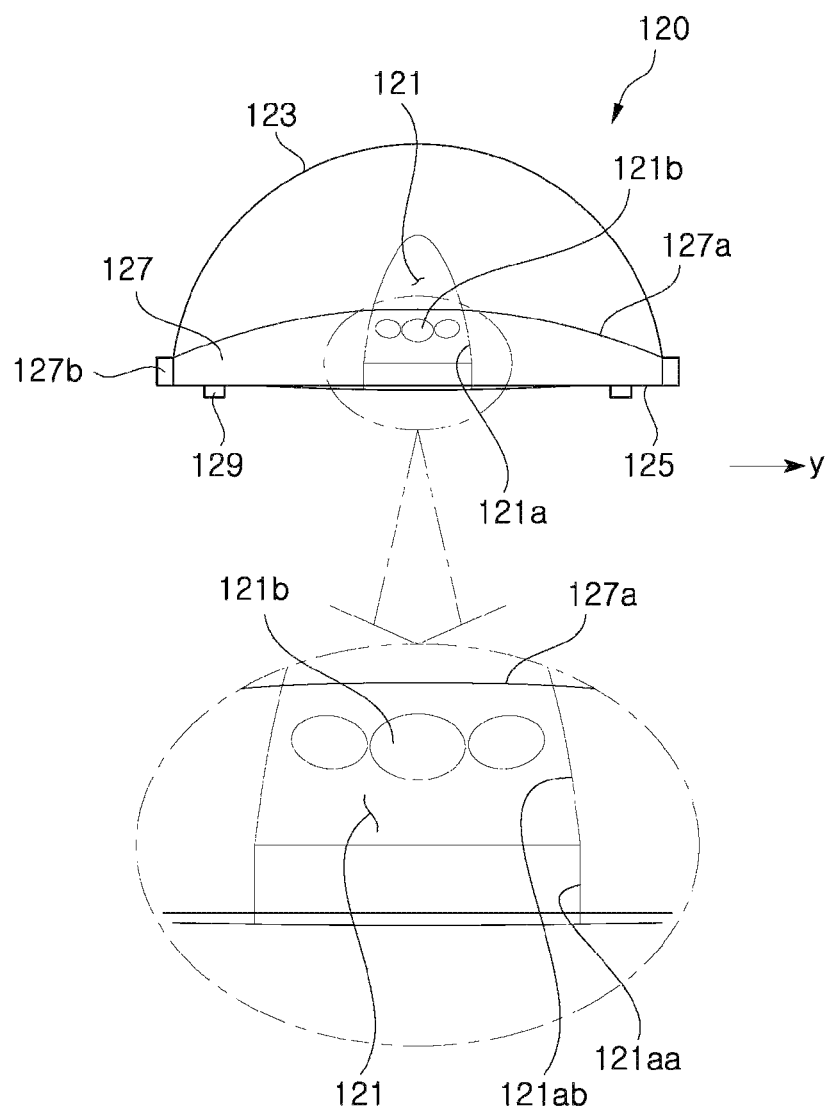
FIG. 15 is a side view of the lens of the light emitting module according to the second exemplary embodiment taken in a minor axis direction of a light exit portion of the lens.
Figure 16:
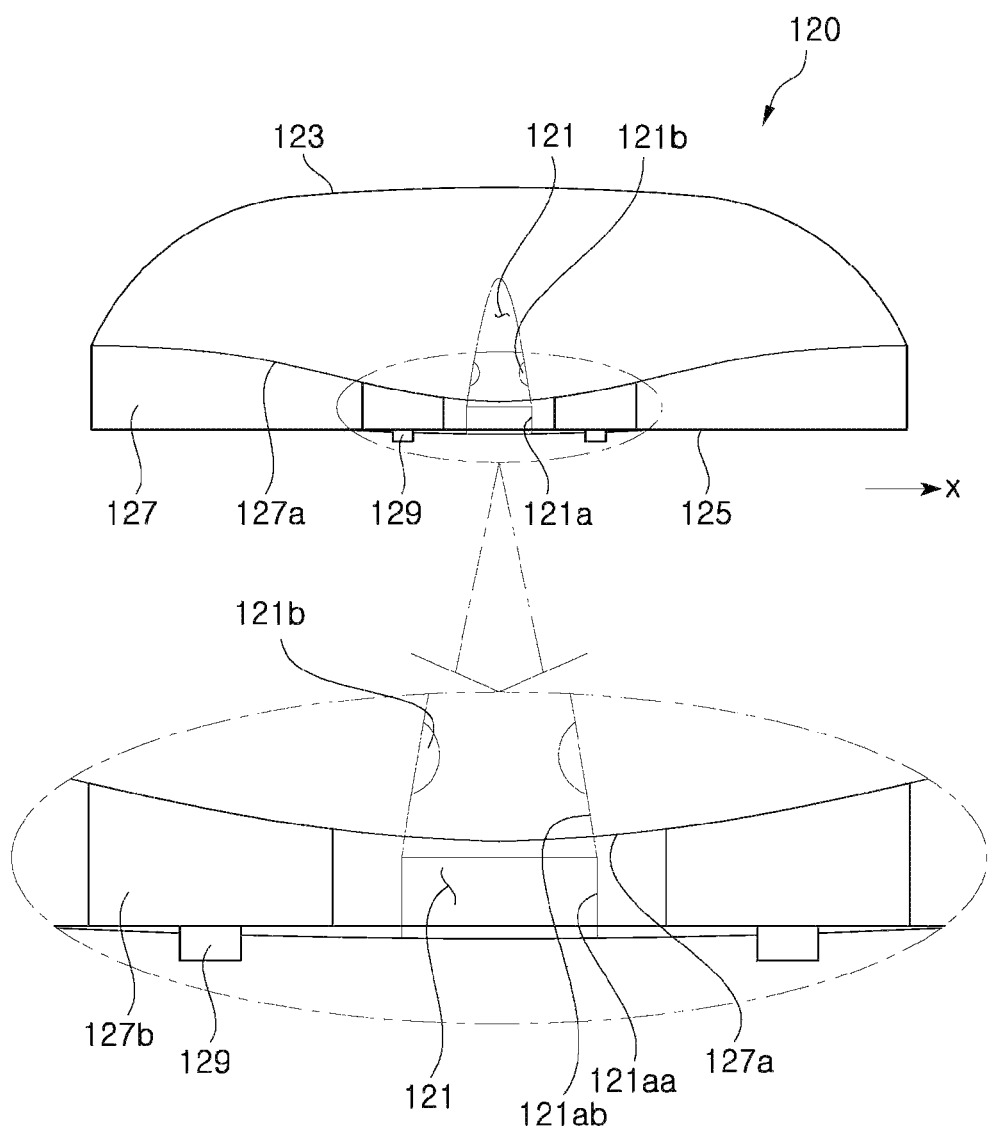
FIG. 16 is a side view of the lens of the light emitting module according to the second exemplary embodiment taken in a major axis direction of the light exit portion of the lens.

FIG. 13 is a perspective view of a light emitting module according to a second exemplary embodiment, and FIG. 14 is a plan view of a lens of the light emitting module according to the second exemplary embodiment. FIG. 15 is a side view of the lens of the light emitting module according to the second exemplary embodiment taken in a minor axis direction of a light exit portion of the lens and FIG. 16 is a side view of the lens of the light emitting module according to the second exemplary embodiment taken in a major axis direction of the light exit portion of the lens.

Referring to FIG. 13, the light emitting module 100 according to the second exemplary embodiment includes a light emitting device 110 and a lens 120. The light emitting module 100 according to the second exemplary embodiment is similar to that of the first exemplary embodiments. As such, repeated descriptions of the same components already described above with reference to the first exemplary embodiment will be omitted.

According to the illustrated exemplary embodiment, the lens 120 is disposed to cover the light emitting device 110 to distribute light emitted from the light emitting device 110. The lens 120 may include a light incident portion 121 through which light emitted from the light emitting device 110 enters the lens 120, and a light exit portion 123 through which the light exits the lens 120.

As shown in the drawings, the light incident portion 121 may be formed at a lower portion of the lens 120 and may be disposed at the center of the lens 120. The light incident portion 121 may have a concave shape, for example, a bell shape. In addition, the light incident portion 121 may have an elliptical cross-section with a major axis in the y-axis direction and a minor axis in the x-axis direction.

A light incident surface 121a corresponding to an inner surface of the light incident portion 121 may be used as a surface through which light enters the lens 120, and may include a vertical light incident facet 121aa disposed at a lower portion of the light incident portion 121 and an oblique light incident facet 121ab disposed at an upper portion of the vertical light incident facet 121aa.

Referring to FIG. 14, the oblique light incident facet 121ab may be formed with protruding light incident facets 121b. According to the illustrated exemplary embodiment, the oblique light incident facet 121ab is formed with six protruding light incident facets 121b, in which three protruding light incident facets 121b are disposed on each of relatively large areas of the oblique light incident facet 121ab. The protruding light incident facets 121b may protrude towards the inward direction of the light incident portion 121 and may have substantially an elliptical shape.

In the illustrated exemplary embodiment, two groups of three protruding light incident facets 121b are formed on the oblique light incident facet 121ab in the major axis direction thereof, in which the three protruding light incident facets 121b disposed on one surface of the oblique light incident facet 121ab may be linearly arranged. Among these linearly-arranged protruding light incident facets 121b, the protruding light incident facet 121b disposed at the center may have a larger size than the protruding light incident facets 121b disposed at both sides thereof.

As in the first exemplary embodiment, a flange boundary 127a according to the second exemplary embodiment has a curved shape. Referring to FIG. 15, a distance between the flange boundary 127a and the lower surface 125 is relatively greater in the major axis direction of the light incident portion 121 (e.g., the minor axis direction of the light exit portion 123 of the lens 120, the y-axis direction), and referring to FIG. 16, the distance between the flange boundary 127a and the lower surface 125 is relatively smaller in the minor axis direction of the light incident portion 121 (e.g., the major axis direction of the light exit portion 123 of the lens 120, the x-axis direction).

As such, with the flange boundary 127a formed in a curved shape, the protruding light incident facets 121b may be placed below the flange boundary 127a in the major axis direction of the light incident portion 121 (e.g., the minor axis direction of the light exit portion 123 of the lens 120, the y-axis direction) and above the flange boundary 127a in the minor axis direction of the light incident portion 121 (e.g., the major axis direction of the light exit portion 123 of the lens 120, the x-axis direction).

Furthermore, a plurality of legs 129 may be linearly arranged in the major axis direction of the light incident portion 121 to be closer to the outer periphery of the lens 120 than the legs of the lens according to the first exemplary embodiment. In addition, a flange protrusion 127b may protrude outwardly from the flange 127 to be placed near each of the legs 129. Although the flange protrusions 127b are illustrated as being placed near the legs 129, the inventive concepts are not limited thereto, and the flange protrusions may be disposed irrespective of the locations the legs 129 in other exemplary embodiments.

The flange protrusions 127b may protrude outwardly from the flange 127, and may be formed in a circular shape partially protruding therefrom, as shown in FIG. 13 and FIG. 14. Further, referring to FIG. 16, an upper surface of the flange protrusion 127b may be disposed along the flange boundary 127a. Accordingly, the upper surface of the flange protrusions 127b may be formed to have a curved shape.

In the illustrated exemplary embodiment, four flange protrusions 127b may be provided, with a gate G disposed between adjacent flange protrusions 127b. The gate G may be formed during the process of forming the lens 120, such as by injection molding. The gate G may protrude outwardly from the flange 127. A protruding length of the flange protrusions 127b protruding from the flange 127 may be greater than a protruding length of the gate G protruding from the flange 127 between the adjacent flange protrusions 127b.

When the plurality of lenses 120 is stored in a mixed state or in a process of mounting the lenses 120 on the substrate 200, the surfaces of the lenses 120 (for example, the light exit surface thereof) may be scratched by the gate G, which may have a sharp distal end. However, according to the illustrated exemplary embodiment, since the flange protrusions 127b protrude to a greater length from the flange than the gate G, the surface of the lens 120, such as the light exit surface thereof, may be prevented from being scratched by the gate G.

Figure 17:
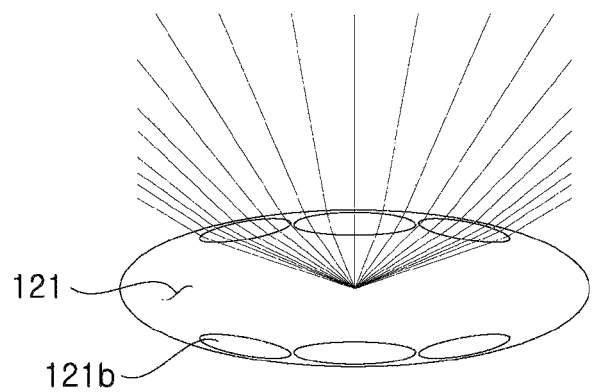
FIG. 17 is a view illustrating an optical path of light emitted from the light emitting module according to the second exemplary embodiment.
Figure 17:
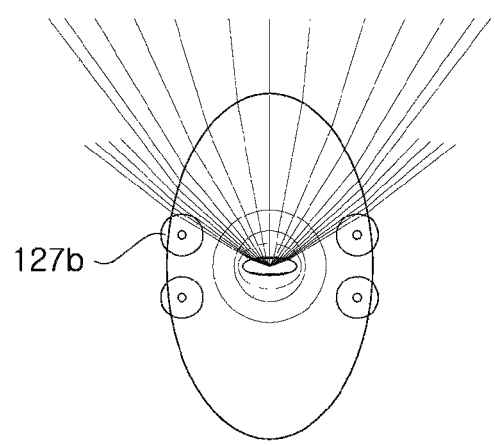

FIG. 17 is a view illustrating an optical path of light emitted from the light emitting module according to the second exemplary embodiment.

Light emitted from the light emitting device 110 may enter the lens 120 through the protruding light incident facet 121b, as shown in FIG. 17(a). In addition, as shown in FIG. 17(b), the light may be discharged from the lens through the light exit portion 123. In the illustrated exemplary embodiment, the flange protrusions 127b may be disposed on the lens 120, as shown in FIG. 17(b), such that light is not affected by the flange protrusions 127b when the light having entered the lens 120 through the protruding light incident facets 121b of the light incident portion 121 is discharged through the light exit surface of the lens 120.

More particularly the lens 120 according to the illustrated exemplary embodiment has an optical path that allows light emitted from the light emitting device 110 to be concentrated in the minor axis direction (x-axis direction) of the light exit portion 123 after passing through the lens 120. The light incident portion 121 is formed with the plurality of protruding light incident facets 121b, thereby enabling relative diversification of the optical path through which light is concentrated while preventing light from being concentrated on a particular location or from failing to reach a certain location. In addition, the flange protrusions 127b are formed to be deviated from the optical path of light discharged through the lens 120, thereby preventing the light from being concentrated on a particular location by the flange protrusions 127b.

Figure 18:
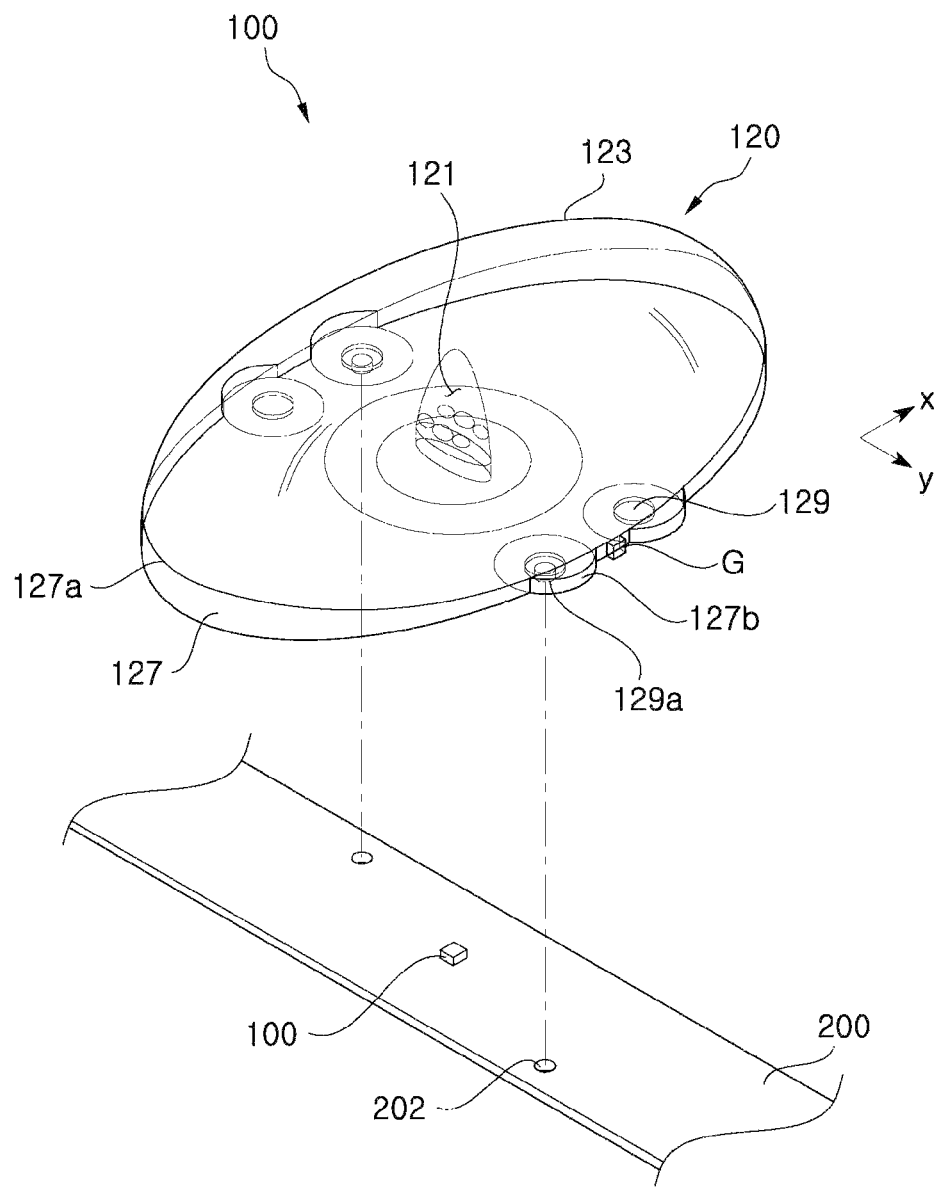
FIG. 18 is a perspective view of a light emitting module according to a third exemplary embodiment.
Figure 19:
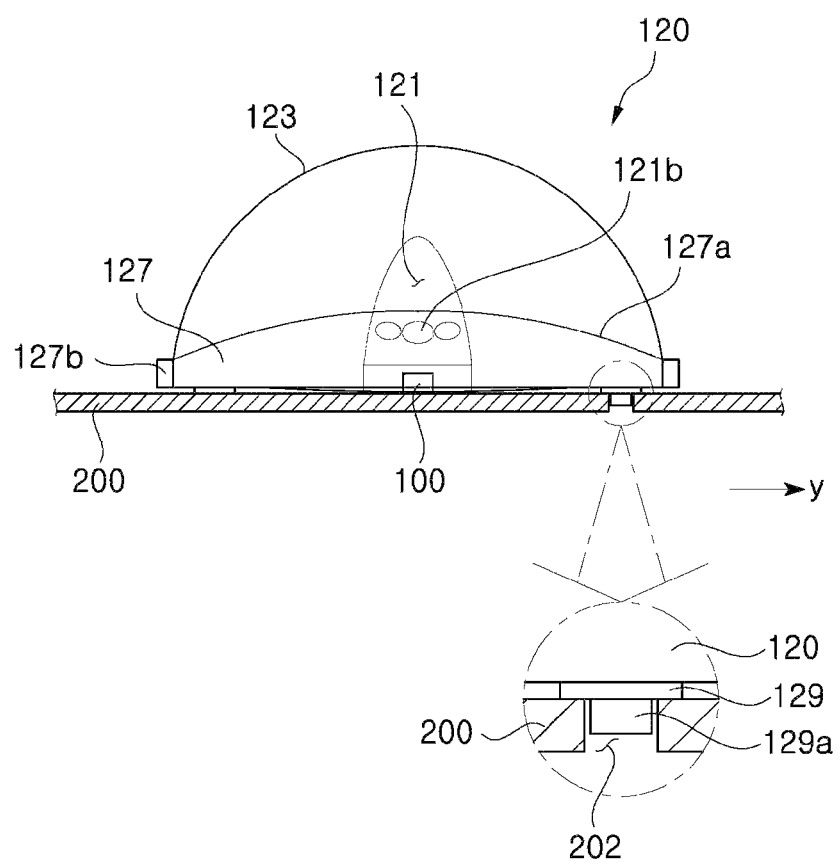
FIG. 19 is a side view of the light emitting module according to the third exemplary embodiment.

FIG. 18 is a perspective view of a light emitting module according to a third exemplary embodiment, and FIG. 19 is a side view of the light emitting module according to the third exemplary embodiment.

Referring to FIG. 18 and FIG. 19, the light emitting module 100 according to the third exemplary embodiment includes a light emitting device 110 and a lens 120. The light emitting module 100 according to the illustrated exemplary embodiment is similar to that of the first or second exemplary embodiment. As such, repeated descriptions of the elements forming the light emitting module 100 that have been already described above with reference to the first and second exemplary embodiments will be omitted.

According to the illustrated exemplary embodiment, the lens 120 may be formed with a plurality of legs 129, and leg protrusions 129a may be formed on some or each of the legs 129. The leg protrusion 129a may protrude downwardly from a lower surface of the leg 129, and may have a smaller diameter than that of the leg 129. According to the illustrated exemplary embodiment, the legs 129 may have a circular shape in plan view and the leg protrusions 129a may have a circular shape in plan view. However, the inventive concepts are not limited thereto, and the legs and the leg protrusions may have various shapes in other exemplary embodiments.

The substrate 200 may be formed with substrate holes 202 at locations corresponding to the leg protrusions 129a of the lens 120 to be mounted on the substrate 200. The substrate hole 202 may be formed through the substrate 200, and may have a shape corresponding to the shape of the leg protrusion 129a to receive the leg protrusion 129a therein when the leg protrusion 129a is inserted into the substrate hole 202.

As such, as shown in FIG. 19, the lens 120 may be mounted on the substrate 200 with the leg protrusions 129a inserted into the substrate holes 202. In this case, as the leg protrusions 129a protrude downwardly from the lower surfaces of the legs 129, a portion of the lower surface of the leg 129 outside the leg protrusion 129a may adjoin an upper surface of the substrate 200. In addition, the lower surface of the leg 129 not formed with the leg protrusion 129a may adjoin the upper surface of the substrate 200.

In this manner, with the leg protrusions 129a inserted into the substrate holes 202, the lens 120 is mounted on the substrate 200 and the legs 129 of the lens 120 are coupled to the substrate 200, thereby improving the bonding strength between the lens 120 and the substrate 200.

Furthermore, the light emitting modules 100 according to the first to third exemplary embodiments may be manufactured according to each of these exemplary embodiments or in the form of a combination of these exemplary embodiments.

According to exemplary embodiments, a light emitting module has a substantially rectangular light distribution, thereby enabling uniform emission of light in combination with distribution of light emitted from adjacent light emitting modules.

In addition, a lens included in the light emitting module has a slanted surface on an outer lower surface thereof, such that a separate reflective sheet can be disposed on the lower surface of the lens through the slanted surface, thereby enabling reduction in the number of processes by obviating a separate bonding member for securing the reflective sheet.

Light emitted through a side surface of the light emitting device can be reflected by a light exit portion or a flange of the lens, instead of being discharged from the lens. The slanted surface formed on the lower surface of the lens reflects light that has been reflected by the light exit portion or the flange of the lens to be discharged through the light exit portion or the flange of the lens, whereby light can be dispersed broadly when discharged from the lens.

Furthermore, vertical light incident facets are formed on the light incident portion of the lens to allow total reflection of light inside the light incident surface, to thereby change a dark portion formed at the center of the lens into a bright portion, and to allow light emitted through the side surface of the light emitting device to be discharged through the flange of the lens, whereby the light can be dispersed broadly when discharged from the lens.

Furthermore, a plurality of protruding light incident facets is formed on the light incident portion of the lens to protrude in an inward direction of the light incident portion, such that an optical path of light entering the lens can be adjusted based on the shape and location of the protruding light incident facets, thereby enabling more uniform discharge of light through the lens.

Furthermore, a plurality of flange protrusions protrudes outwardly from the flange of the lens so as to have a greater protrusion length than a gate formed in manufacture of the lens, thereby suppressing generation of scratches on surfaces of other lenses due to the gate.

Furthermore, a leg protrusion is formed on a leg of the lens and the substrate is formed with a substrate hole which receives the leg protrusion when the leg protrusion is inserted into the substrate hole, thereby improving coupling strength between the lens and the substrate when the lens is mounted on the substrate.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A lens for dispersing light emitted from a light emitting device, comprising:
    a lower surface;
    a light incident portion having a concave shape from the lower surface, the light incident portion having a light incident surface;
    a light exit portion through which light having entered the lens through the light incident portion exits the lens to an outside of the lens; and
    a plurality of legs formed on a lower surface of the lens,
    wherein the legs has a first thickness and includes a leg protrusion protruding downwards from a lower surface thereof, the leg protrusion has a second thickness greater than the first thickness,
    wherein the light incident portion includes an oblique light incident facet, a side light incident facet, and a first planar facet connecting the oblique light incident facet and the side light incident facet,
    wherein the side light incident facet is disposed between the oblique light incident facet and the legs,
    wherein a width of the side light incident facet is greater than that of the oblique light incident facet,
    wherein a line connecting a top of the light incident portion and a point that adjoins the oblique light incident facet and the first planar facet forms a first acute angle with respect to the lower surface, and
    wherein another line connecting a bottom of the side light incident facet and a point that adjoins the first planar facet and the side light incident facet forms a second angle greater than the first acute angle with respect to the lower surface.

2. The lens of claim 1, wherein:
    the light incident surface includes at least one protruding light incident facet; and
    the at least one protruding light incident facet protrudes from the oblique light incident facet.

3. The lens of claim 2, wherein the at least one protruding light incident facet has a shape protruding inwardly from the light incident surface.

4. The lens of claim 2, wherein the at least one protruding light incident facet has a curved protruding shape.

5. The lens of claim 2, wherein the at least one protruding light incident facet includes a pair of protruding light incident facets opposing each other.

6. The lens of claim 2, wherein the at least one protruding light incident facet has an elliptical shape.

7. The lens of claim 1, wherein each of the light incident portion and the light exit portion has a major axis and a minor axis in plan view, and the major axis of the light incident portion is disposed at a right angle with respect to the major axis of the light exit portion.

8. The lens of claim 7, wherein the lower surface includes a slanted surface extending downwardly from the lower surface.

9. The lens of claim 2, wherein two or more of the protruding light incident facets are disposed on a same horizontal plane.

10. The lens of claim 1, further comprising a flange disposed between the light exit portion and the lower surface.

11. The lens of claim 10, wherein a flange boundary is formed between the flange and the light exit portion.

12. The lens of claim 11, wherein:
the light incident surface includes at least one protruding light incident facet; and
the at least one protruding light incident facet is placed below the flange boundary in a major axis of the light incident portion.

13. The lens of claim 11, wherein:
the light incident surface includes at least one protruding light incident facet; and
the at least one protruding light incident facet is placed above the flange boundary in a minor axis direction of the light incident portion.

14. A light emitting module comprising:
a light emitting device; and
a lens disposed over the light emitting device to disperse light emitted from the light emitting device, the lens including:
  a light incident portion through which light emitted from the light emitting device enters the lens;
  a light exit portion through which the light exits the lens; and
  a plurality of legs formed on a lower surface of the lens,
wherein:
the light incident portion has a concave shape from a lower surface of the lens and includes a light incident surface;
at least one of the legs has a first thickness and includes a leg protrusion protruding downwards from a lower surface thereof, the leg protrusion has a second thickness greater than the first thickness;
the light incident portion includes an oblique light incident facet, a side light incident facet, and a first planar facet connecting the oblique light incident facet and the side light incident facet;
the side light incident facet is disposed between the oblique light incident facet and the legs;
a width of the side light incident facet is greater than that of the oblique light incident facet;
a line connecting a top of the light incident portion and a point that adjoins the oblique light incident facet and the first planar facet forms a first acute angle with respect to the lower surface; and
another line connecting a bottom of the side light incident facet and a point that adjoins the first planar facet and the side light incident facet forms a second angle greater than the first acute angle with respect to the lower surface.

15. The light emitting module of claim 14, wherein the light incident surface includes a plurality of protruding light incident facets protruding inwardly from the light incident surface.

16. The light emitting module of claim 14, wherein each of the light incident portion and the light exit portion has a major axis and a minor axis in plan view, and the major axis of the light incident portion is disposed at a right angle with respect to the major axis of the light exit portion.

17. The light emitting module of claim 16, wherein
at least two protruding light incident facets are arranged on one of the oblique light incident facets at a substantially same height.

18. The light emitting module of claim 14, wherein:
the light incident surface includes a plurality of protruding light incident facets protruding inwardly from the light incident surface; and
the lens further comprises:
  a flange disposed between the light exit portion and the lower surface of the lens; and
  at least one flange protrusion partially protruding from the flange in an outward direction of the lens.

19. The light emitting module of claim 18, wherein a curved flange boundary is formed between the flange and the light exit portion.

* * * * *